United States Patent Office 3,289,650
Patented Dec. 6, 1966

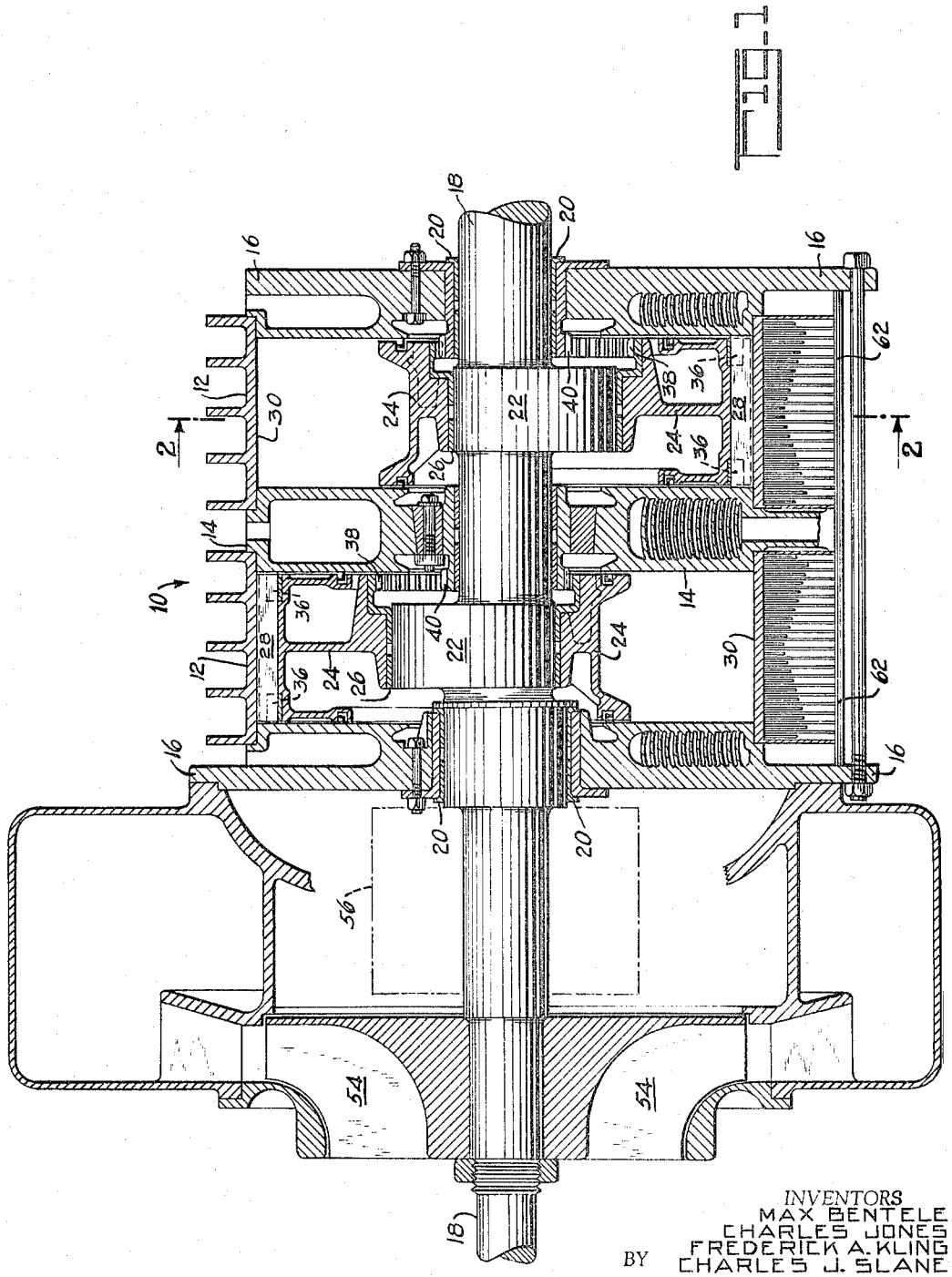

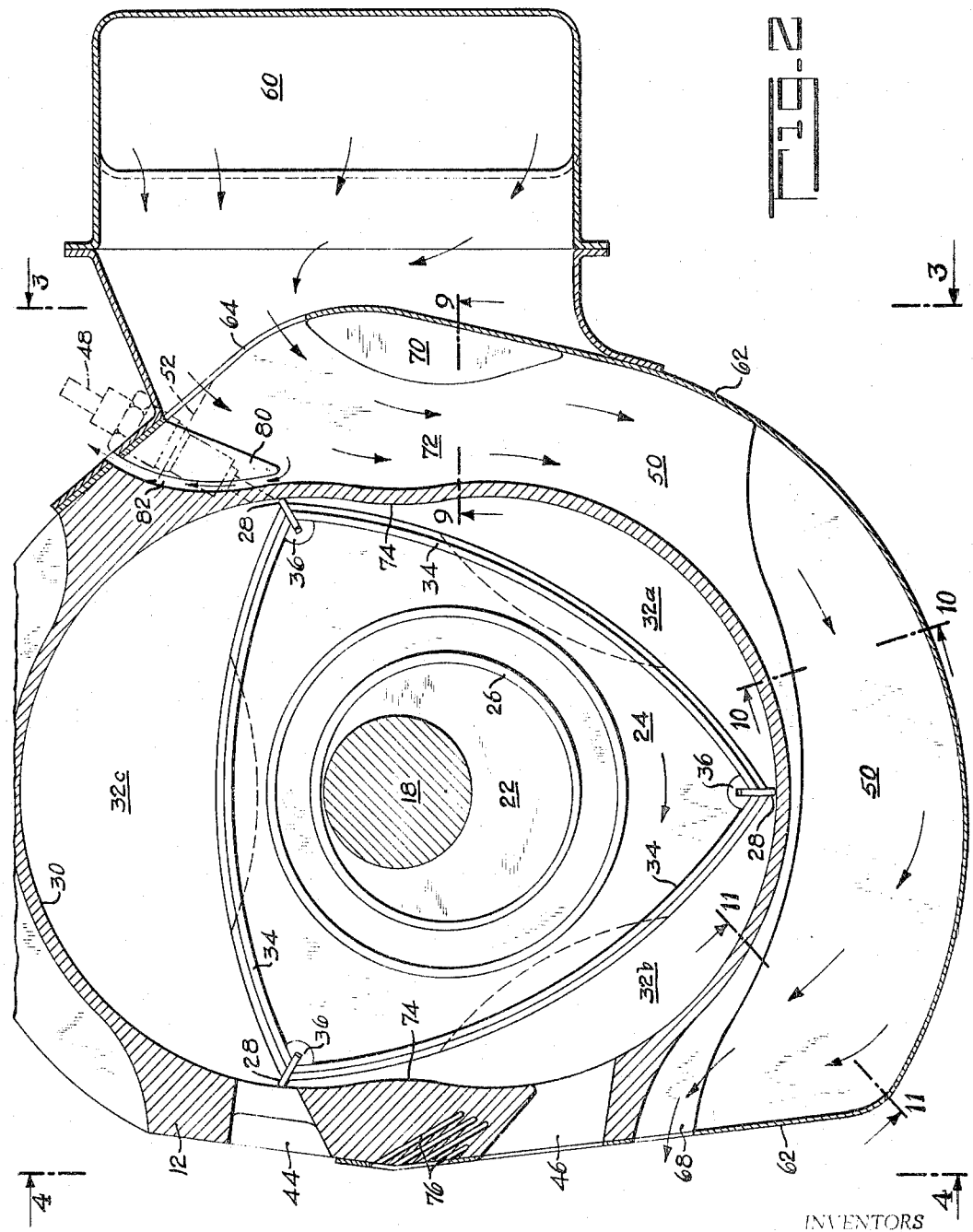

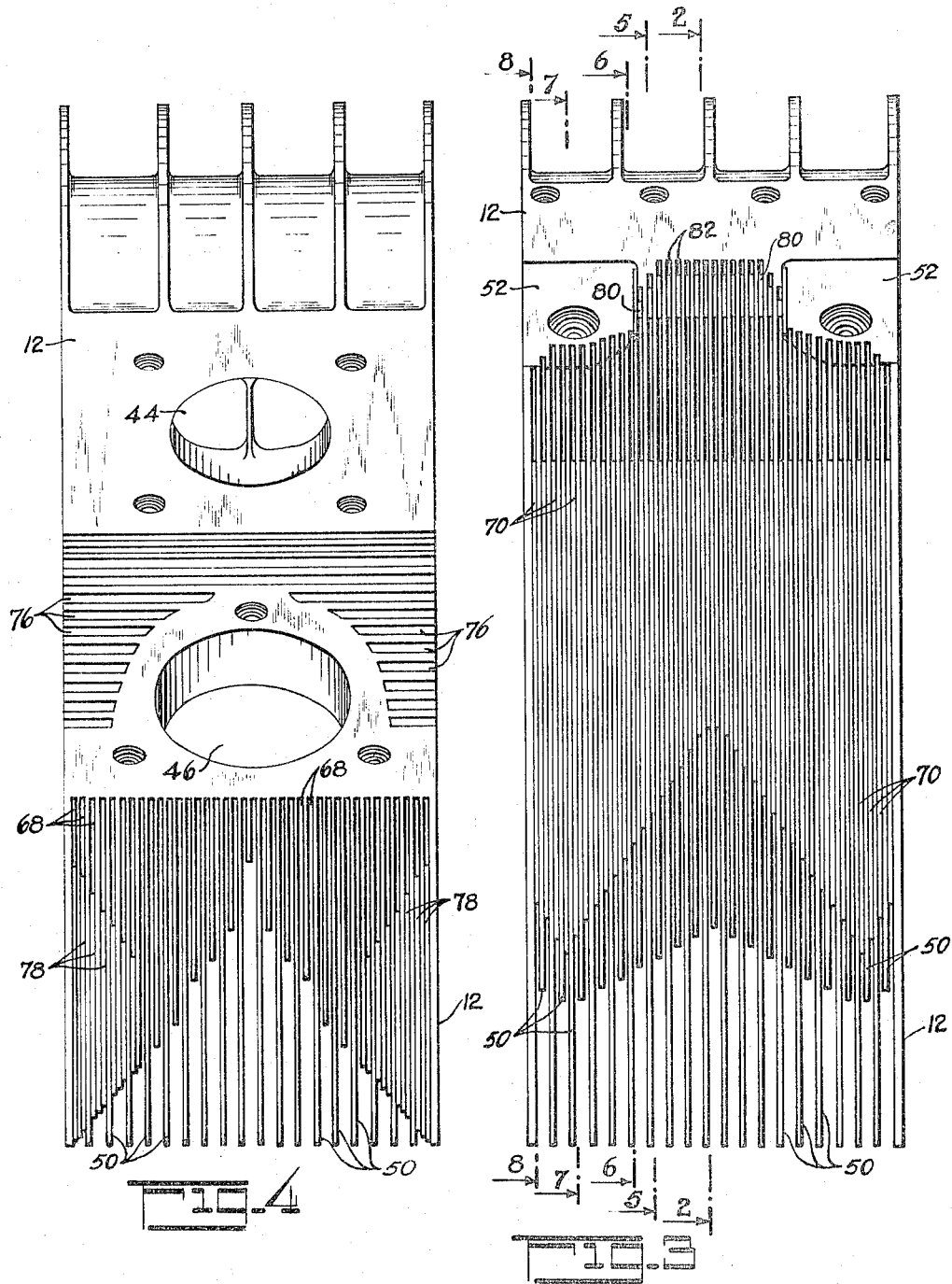

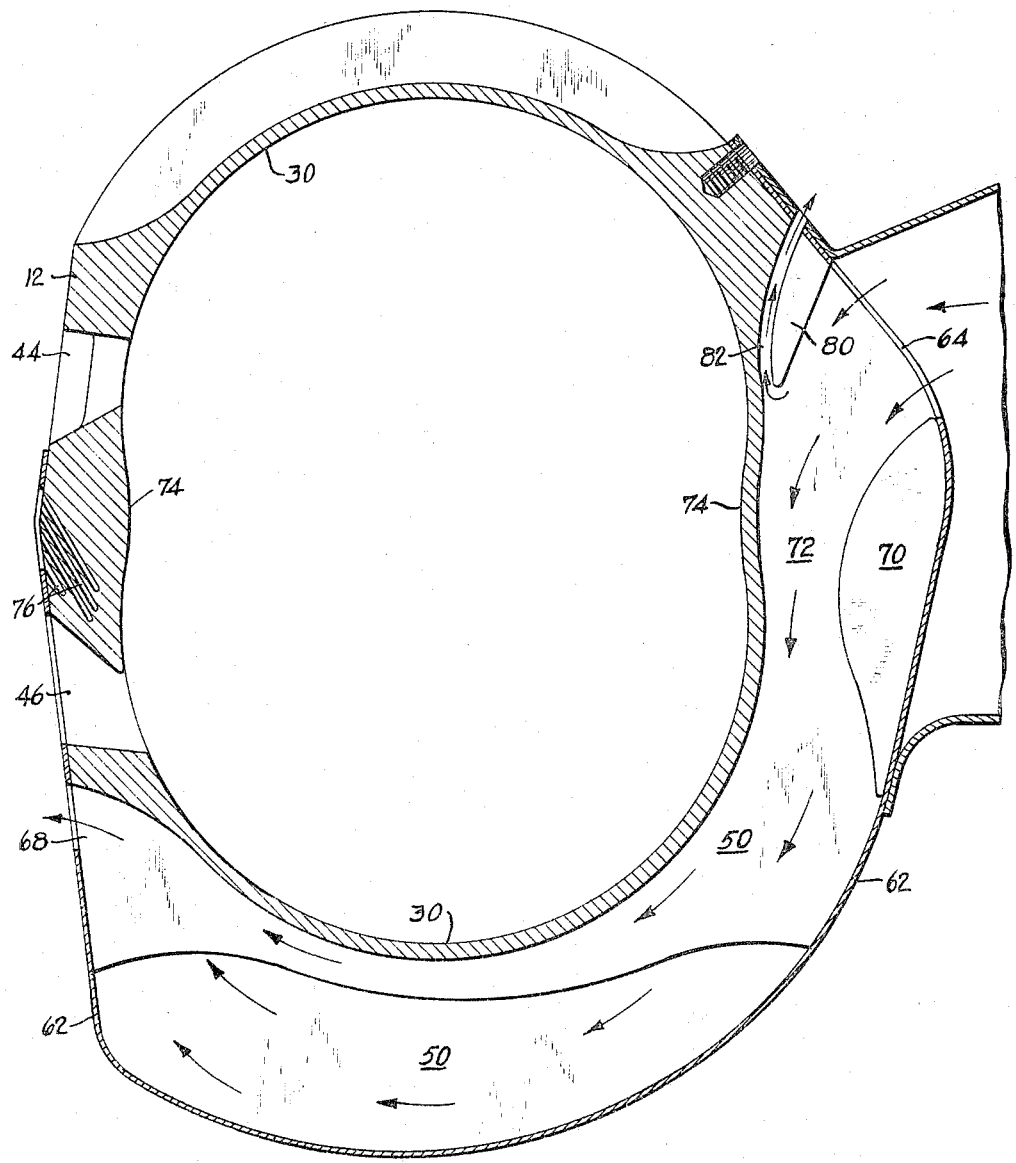

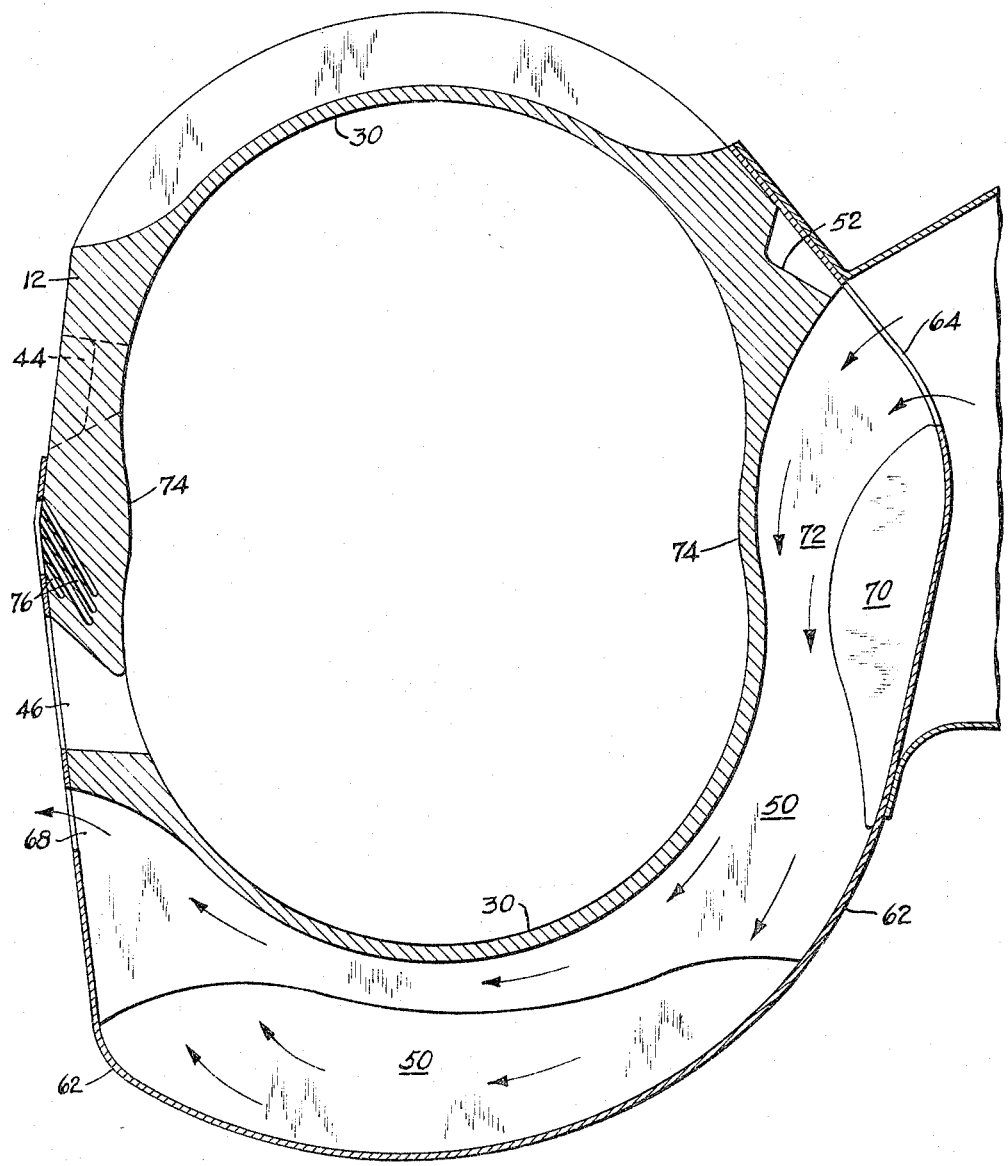

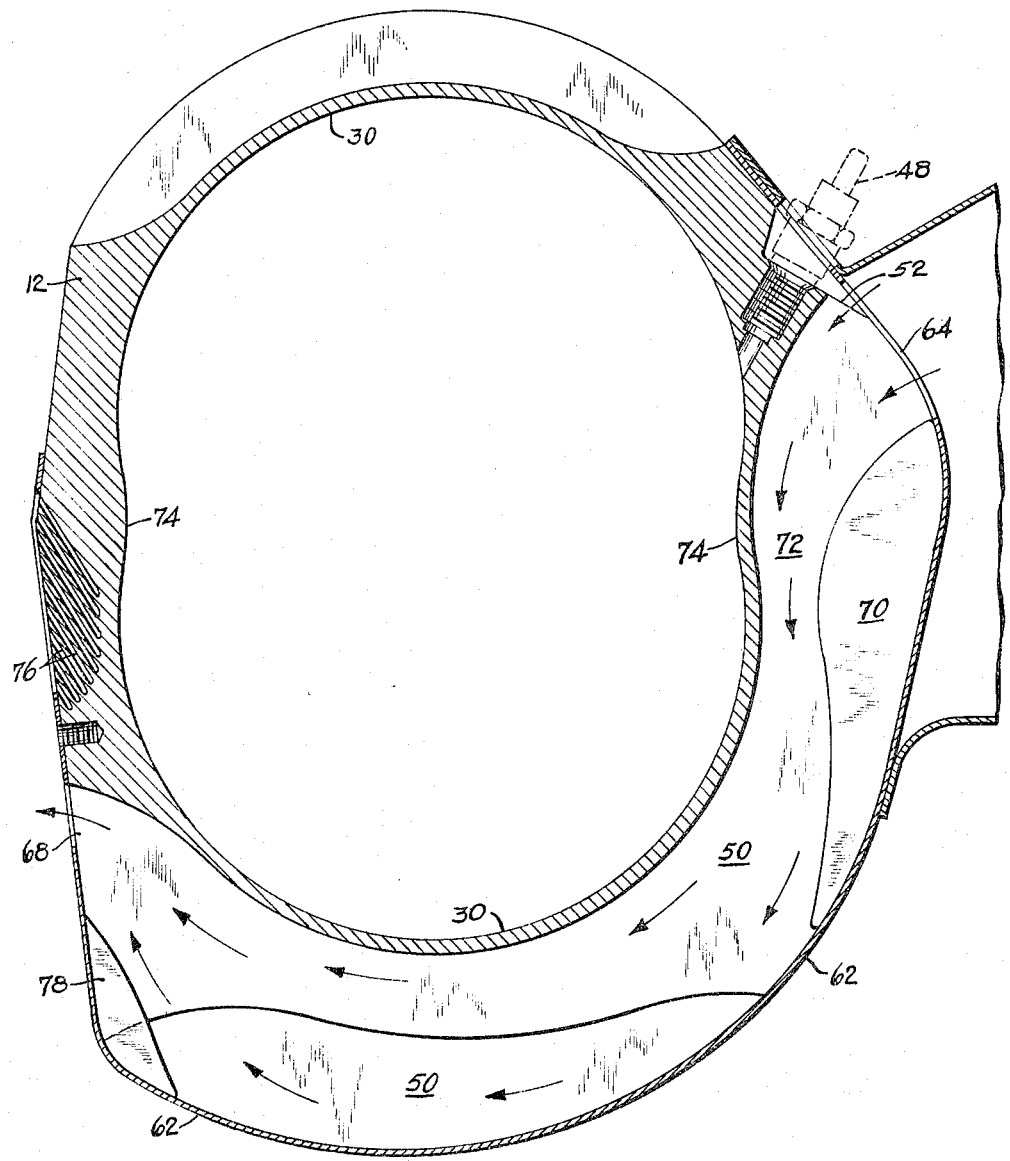

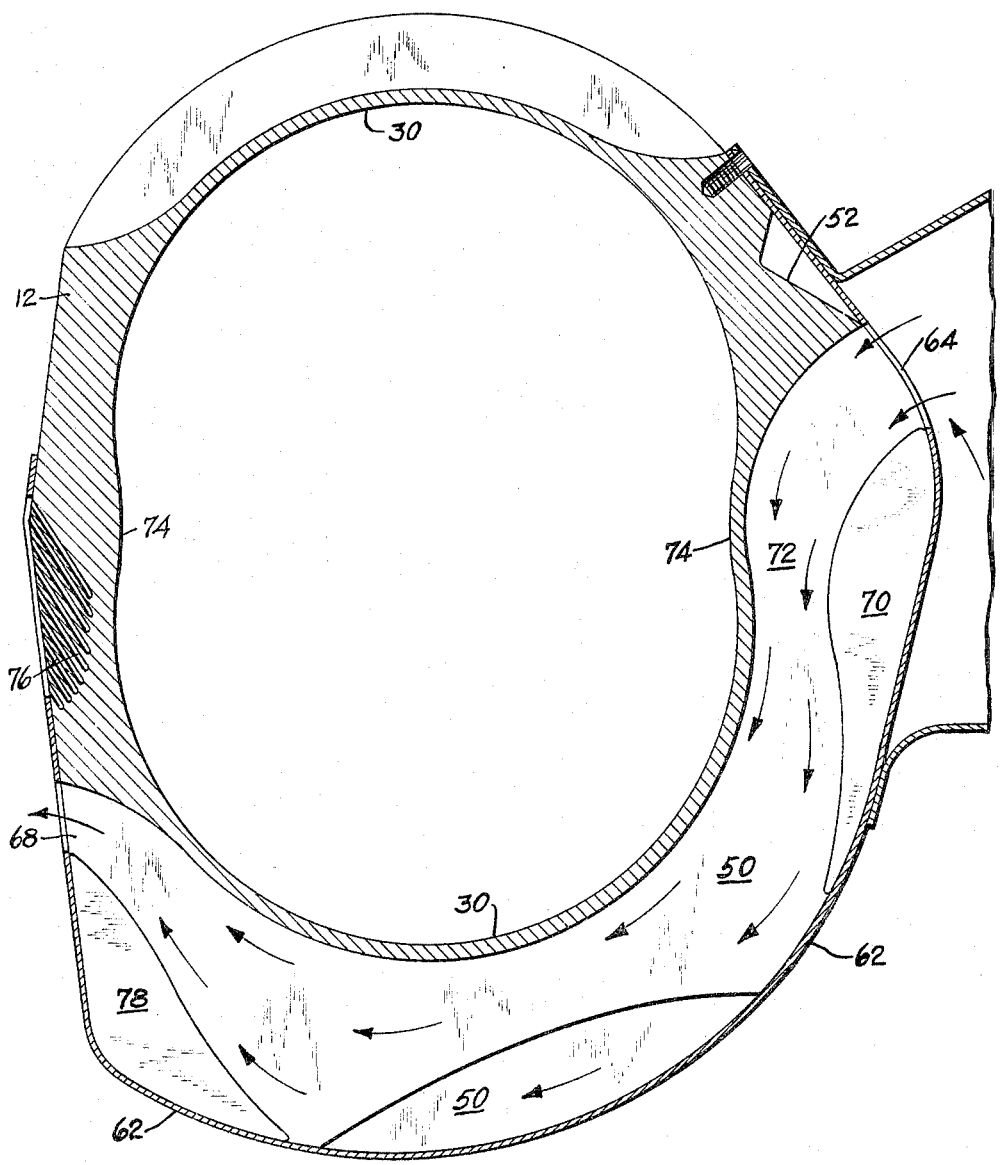

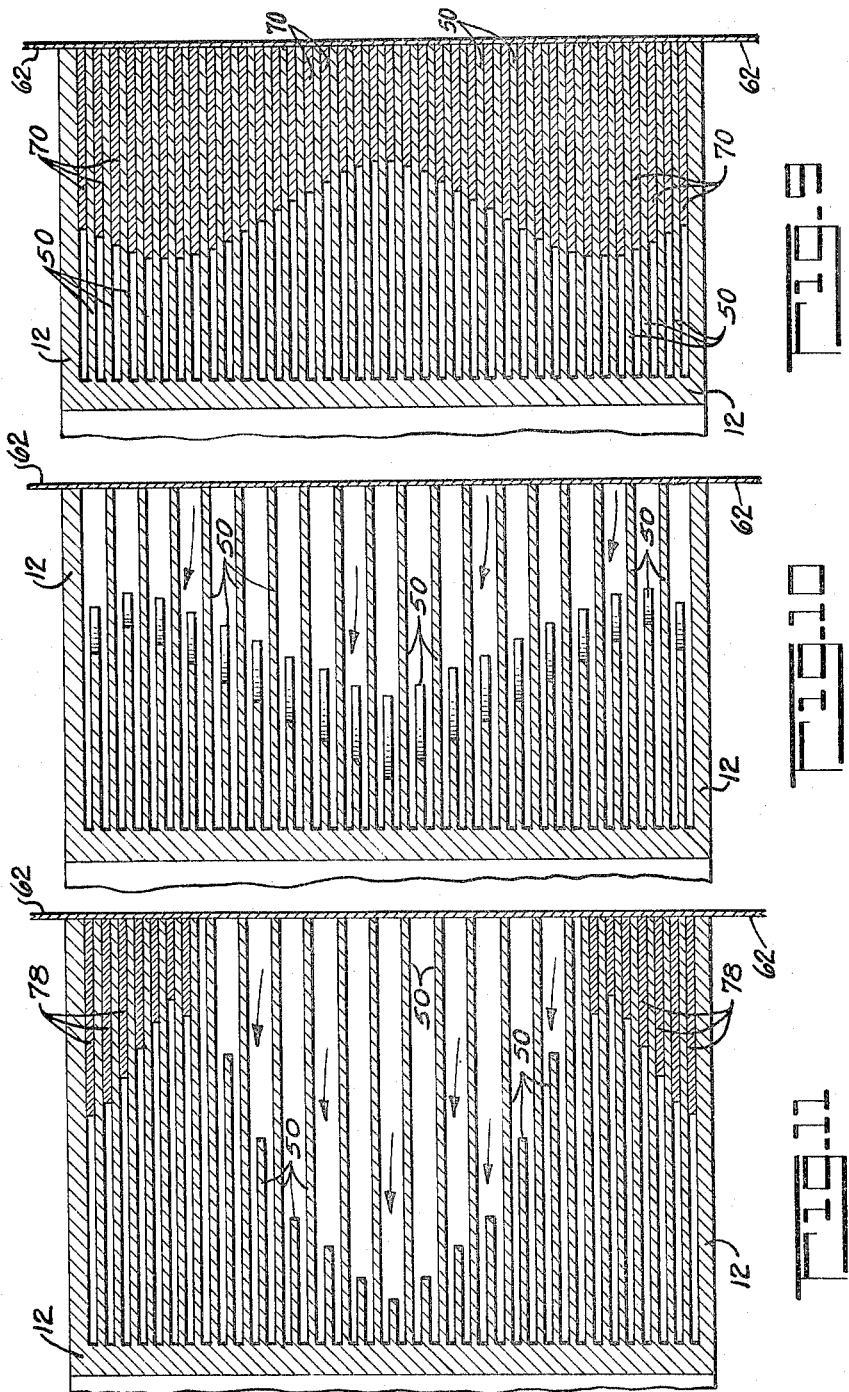

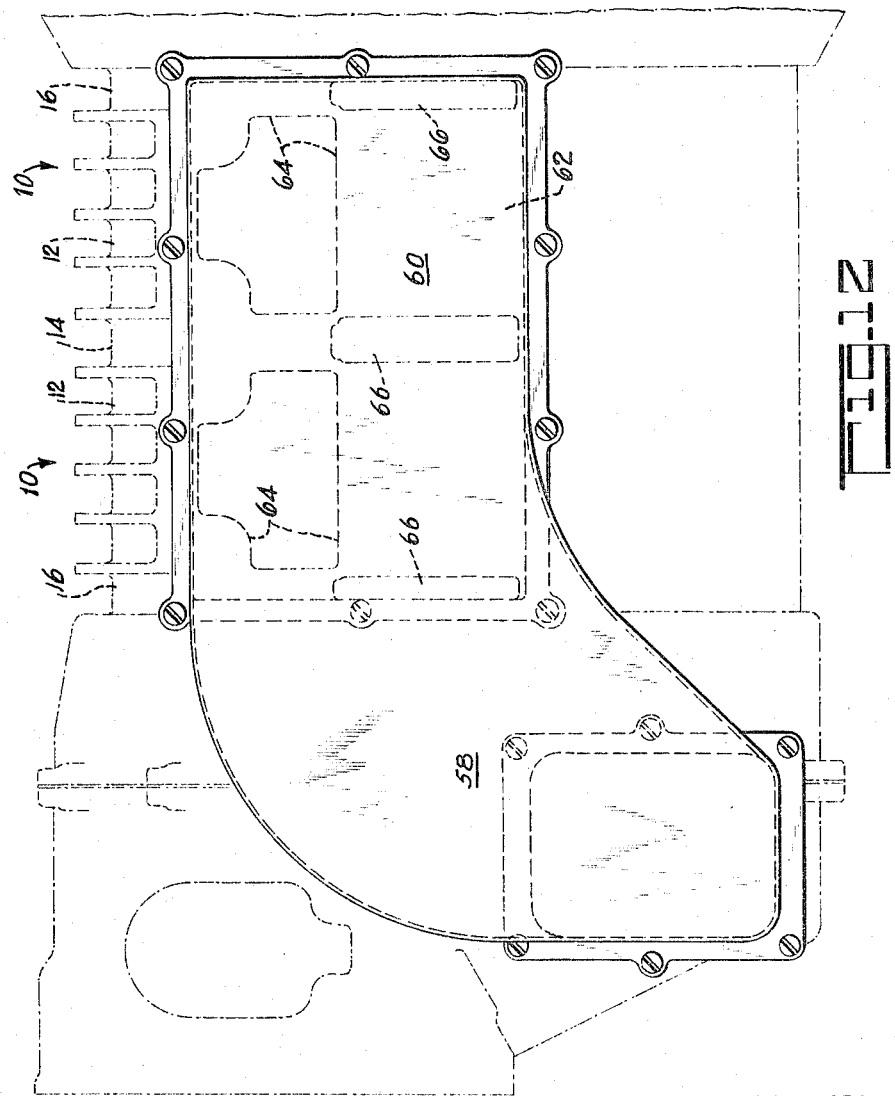

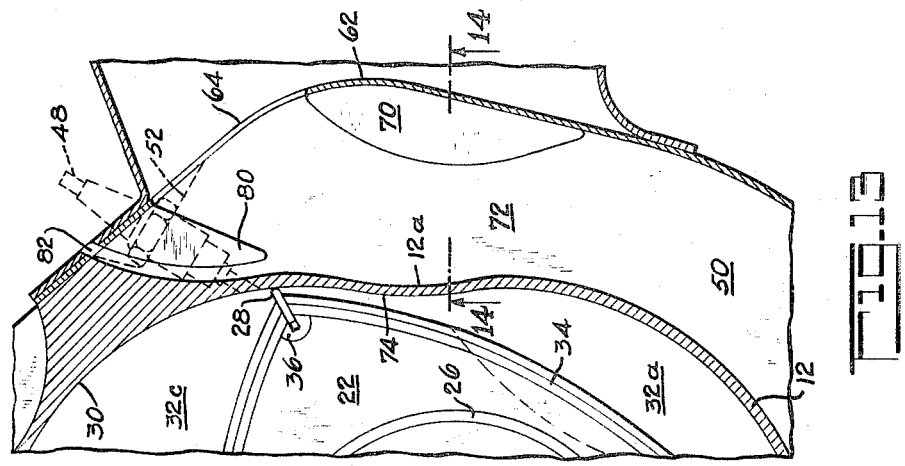
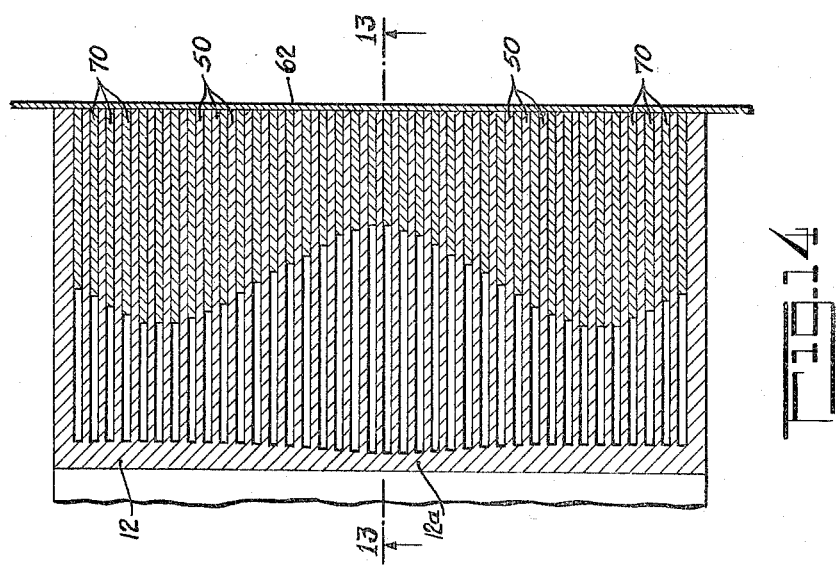

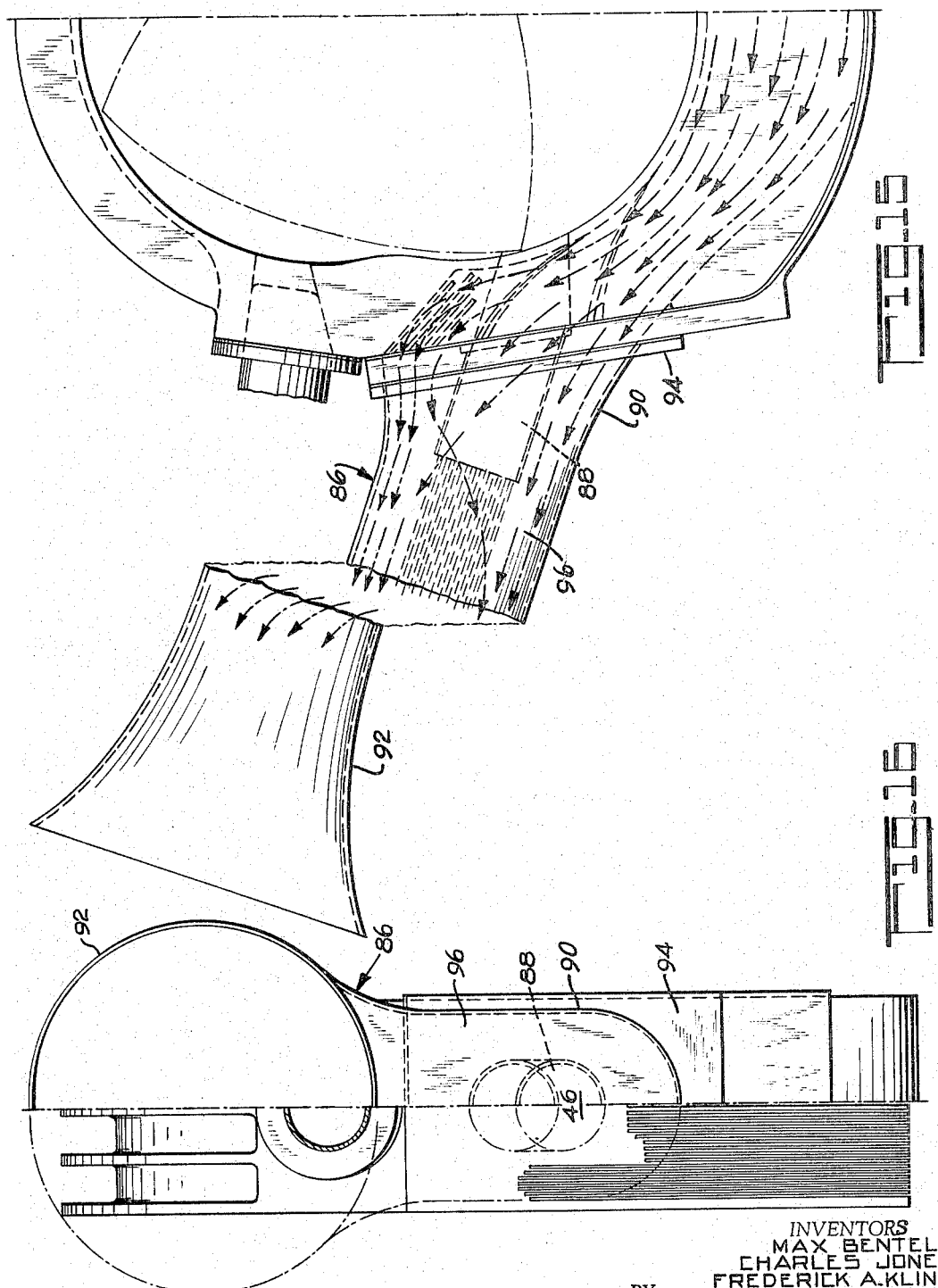

3,289,650
AIR COOLED ROTARY COMBUSTION ENGINE
Max Bentele, Ridgewood, Charles Jones, Paramus, and Frederick A. Kling, North Haledon, N.J., and Charles J. Slane, Riverdale, N.Y., assignors to Curtiss-Wright Corporation, a corporation of Delaware
Filed Nov. 18, 1964, Ser. No. 412,043
14 Claims. (Cl. 123—8)

This invention relates to rotary combustion engines and is particularly directed to an improvement in air-cooled rotary combustion engines of the type disclosed in copending application Serial No. 225,316 filed September 21, 1962.

As explained in said above-mentioned copending application, providing air cooling for rotary combustion engines of the type disclosed therein is a difficult problem due to the variation in the heat input around the periphery of the outer body of said engines. It has also been further found that the heat input varies axially across the outer body of engines of this type with the highest heat input occurring at the center line or the portion intermediate the axial ends of the peripheral wall of the outer body of said engines. Because of the problems encountered in air cooling this type of engine, to provide sufficient weight flow of cooling air for the entire outer periphery of the outer body would require an excessive amount of air cooling blower horsepower so as to heretofore make such air cooling for engines of this type impractical. It has been found, however, that by providing the weight flow of air at increased velocity at selective regions of the outer body wherein the highest heat input is found and by decreasing the flow resistance to the cooling air flow in other regions, the air cooling blower horsepower required to circulate the cooling air can be substantially reduced.

It is therefore a prime object of the present invention to provide an air cooling system for a rotary combustion engine wherein a minimum amount of blower horsepower is required for cooling the outer body of the rotary combustion engine. As further explained in said copending application, the ideal situation is to have a one-direction flow path of cooling air around the outer periphery of the outer body which therefore requires a minimum volume of air since a minimum flow path cross-sectional area is to be transversed. However, prior to the present invention, it was believed that with a one-direction flow path the temperature change and pressure drop in the cooling air from the inlet area to the outlet area would be too great to adequately provide satisfactory cooling. The structure of the present invention however, overcomes this objection by increasing the velocity of the cooling air in the regions of high heat input to account for temperature variations in the circumferential direction and by varying the weight flow of the cooling air through said regions in the axial direction to account for axial variations in the heat input. The above variations in the cooling air flow are accomplished by varying the height of the cooling air passages in said regions and by scheduling the cross-sectional flow area of each passage in the axial direction in accordance with the heat input to said passage. In the regions of relatively less heat input, the area of the passages is increased so that less restriction is present to the flow of the cooling air and thus less blower power required to pass the air through these regions. By this means maximum cooling efficiency is obtained for cooling the outer body where it is most needed while in less heated-up areas emphasis is given to reduce the power required for passing the cooling air through the system. As will be apparent from the detailed description found hereinafter, through the means of the present invention a single path circumferential cooling system is provided which provides satisfactory cooling for the outer body while requiring a minimum horsepower drain on the engine for operating the cooling system.

The invention is generally carried out by providing a plurality of closely spaced fins projecting outwardly from the outer periphery of the peripheral or rotor housing wall with said fins extending circumferentially around said peripheral wall in the direction of rotor rotation, from a region extending from a point adjacent that portion of the peripheral wall at which combustion is initiated in the working chambers to a point adjacent the exhaust port. The cooling air is introduced to the passages formed by the fins in the region adjacent the combustion zone and flows in a circumferential direction around the peripheral wall toward the exhaust port. By selectively cropping some of the fins in region of relatively low heat input and providing passageways of reduced cross-section in regions of high heat input, the velocity and quantity of the airflow can be regulated so that sufficient quantity of air traveling at relatively high velocity for rapidly carrying away heat from the peripheral wall will be provided in the relatively high heat input regions while the cropping of the fins in the relatively low heat input regions will serve to reduce the friction losses of the air downstream of the relatively high heat input region. Means including restrictors are also provided for limiting the flow and accelerating the cooling air at the end of its cooling path so that this air will be suitable for cooling the exhaust port region of the peripheral wall. As will be more fully explained hereinafter, the construction of the invention provides sufficient cooling air weight-flow without accompanying large pressure drops in the system.

It is therefore an object of the invention to provide a novel and improved air cooling construction for a rotary combustion engine.

It is another object of the invention to provide a novel and improved air cooling construction for a rotary combustion engine including a single path circumferential cooling system wherein the cooling air is scheduled to provide maximum cooling for regions of the outer body having the relatively highest heat input while eliminating waste of cooling air on regions of the outer body having relatively low heat input.

It is a further object of the invention to provide a novel and improved cooling path construction for the outer periphery of the rotor housing of the rotary combustion engine.

It is an additional object of the invention to provide a novel and improved air cooling construction for a rotary combustion engine which rotary combustion engine has variations in the heat input both in the axial and circumferential directions over the periphery of the outer body with said cooling construction providing maximum cooling for the relatively hot portions of said outer body while requiring a minimum horsepower drain on the horsepower output of said engine for operating the cooling system.

Other objects and advantages of the invention will be best understood upon reading the following detailed description with the accompanying drawings wherein:

FIG. 1 is an axial sectional view of the rotary combustion engine embodying the invention;

FIG. 2 is a sectional view taken along line 2—2 of FIG. 1 and diagrammatically illustrating the cooling flow path through said section;

FIG. 3 is an elevational view taken along line 3—3 of FIG. 2 but showing only the rotor housing construction thereof;

FIG. 4 is an elevational view taken in the direction of line 4—4 of FIG. 2 and again showing only the rotor housing construction;

FIGS. 5, 6, 7 and 8 are sectional views taken along line 5—5, 6—6, 7—7 and 8—8, respectively of FIG. 3;

FIGS. 9–11 are sectional views taken along lines 9—9,

10—10, and 11—11, respectively, of FIG. 2;

FIG. 12 is an elevation of the rotary combustion engine of the invention showing the cooling air supply;

FIG. 13 is a partial sectional view of another embodiment of the invention;

FIG. 14 is a sectional view taken along line 14—14 of FIG. 13;

FIG. 15 is a partial sectional view of still another embodiment of the invention; and FIG. 16 is an end view of FIG. 15.

Referring to the drawings, in particular FIGS. 1 and 2, there is shown therein a multi-unit rotary combustion engine composed of two substantially identical rotary mechanisms or rotary combustion engine units 10. It should be understood, however, that the invention is not limited to the multi-unit rotary combustion engine illustrated in that the invention may be embodied in a single unit rotary mechanism or in rotary mechanisms embodying more than two rotary units. The two rotary combustion units 10 each include an outer body formed by a main rotor housing including a peripheral wall 12 with each said peripheral wall 12 being interconnected at one end by a common end or intermediate housing 14. An end housing 16 is connected to each of the axially outer ends of each peripheral wall 12 to enclose the housing of each rotary mechanism and thereby forming cavities therein. The peripheral walls 12 each have an inner surface 30 which defines the shape of the cavity which cavity has a profile that may be defined as being basically a two-lobed epitrochoid, as illustrated in FIG. 2.

A shaft 18 is rotatably supported in the engine by suitable bearings 20 and the shaft 18 has a pair of oppositely directed eccentric portions 22 formed thereon upon each of which there is a rotatable rotor 24 supported by a suitable bearing 26. The rotors 24 each have three-circumferentially-spaced apex portions for sealing engagement with the inner surface 30 of the peripheral walls 12 each of which carries a seal strip 28 thereby forming working chambers 32a, 32b and 32c between the rotor apex portions which upon relative rotation of the rotor 24 in the outer body 10 vary in volume. Seals 34 are mounted in the side faces of each rotor 24 for sealing engagement with the side faces of the end housings 16 and the side faces of the common end housing or intermediate housing 14 and said seals 34 mate with intermediate seal bodies 36 to provide a continuous seal between the respective chambers 32a, 32b, and 32c thereby preventing any leakage between the working chambers. Each rotor 24 further carries an internally-toothed gear 38 which gear 38 meshes with an externally-toothed gear 40 supported by the end walls 16 or the intermediate wall 14 with the gears 38 and 40 serving to guide the rotor in tracing its epitrochoidal path.

Each of the rotary units 10 is further provided with an intake port 44 (see FIG. 2) for admitting air or a fuel-air mixture, an exhaust port 46 is also provided in each peripheral wall 12 for expelling the burnt gases from the engine and an ignition means 48 may be provided so that during engine operation the stages of intake compression, expansion and exhaust may be carried out. In the embodiment illustrated, a spark plug ignition means is preferably used, although the invention is not so limited. It will be apparent that during the working cycle of the engine, combustion always takes place adjacent the same region of the periphery of the outer body. Therefore, it will be seen that the heat input in the one region of the outer body, adjacent which combustion takes place, will be substantially higher than other regions of the outer body, as for example, the region adjacent the intake port 44. Thus, it may be seen that there will be a substantial variation in the heat input around the periphery of the outer body of the rotary combustion engine. It has been more specifically found that the region of highest heat input in the outer body periphery occurs from a region adjacent the ignition means or spark plug 48 and extends in a downstream direction toward the exhaust port 46, with respect to the direction of rotor rotation. Reference may be made to the above-mentioned copending application wherein there is illustrated a heat flux diagram showing the variation in heat input around the periphery of the outer body in a rotary combustion engine of the type of the present invention.

It has also been further found that the heat input also varies in an axial direction relative to the peripheral wall 12 with the highest heat input occurring at the center line or center portion relative to the axial ends of the rotor housings 12 and gradually becomes less towards the axial ends thereof. Hence, in order to properly cool the outer periphery of the peripheral walls 12, it will be apparent that maximum cooling must be provided circumferentially from a region adjacent the spark plug in a downstream direction and including the regions of maximum heat flux. It is further advantageous to provide maximum cooling in the center portion to limit axial conduction of heat to the side housings and the overhang fins on said peripheral walls which overlap the side housings.

As is well known, the horsepower required to operate the blower for cooling an engine with air is directly proportional to the product of the cooling air weight-flow and the pressure drop in the cooling system. One means for reducing the blower horsepower required for air cooling is to provide a system which has a minimum pressure drop while still maintaining sufficient weight-flow of air to adequately cool the high heat input regions of the outer body. As will be explained in greater detail below, by increasing the velocity of the cooling air at the highest heat input area or the "hot spot," by limiting the weight-flow of cooling air at regions adjacent to the "hot spot" and by removing restrictions to the flow of cooling air downstream of the "hot spot," satisfactory cooling of the "hot spot" region can be accomplished with significant reductions in blower horsepower requirements.

As mentioned in the above-identified copending application, the ideal situation is to have a single flow path around the outer body including the heated-up area which thereby requires a minimum volume flow of cooling air and minimum flow area to be traversed consistent with the heat transfer conditions and a desirable inner wall temperature. The flow path area in this case may be defined as the total cross-sectional area of the cooling air passage normal to the direction of flow. It was previously believed that the use of a single flow path in an engine of the type described above was not desirable due to the change in temperature of the cooling air from the inlet area to the outlet area and also due to the large pressure drop encountered because of the length of the cooling passages. In the present invention however, it has been found that a satisfactory single flow path cooling system can be obtained by properly scheduling or controlling the flow of air in the cooling air flow path so that sufficient cooling air at minimum blower horsepower requirements may be provided even for relatively high output engines wherein large amounts of heat flux are generated.

Referring again to the drawings, in particular FIGS. 1–4, a plurality of circumferentially extending, axially-spaced cooling fins 50 are provided on the outer periphery of the peripheral walls 12 which fins 50 extend from the region adjacent the spark plug bosses 52 to the region adjacent the exhaust port 46. The fins 50 are preferably relatively closely spaced to provide passages of 0.050" in width with the fins preferably being 0.050" in thickness, although not limited to these specific dimensions. As explained above, this is the region which is exposed to the highest heat input during operation of the engine. As illustrated in FIG. 1, cooling fins are also provided in the end housings 16 and the intermediate housing 14 with this fin structure being substantially the same as that disclosed in the above-identified copending application and reference may be made thereto for a more detailed description of the fin structure for the end or intermediate housings. As illustrated in FIGS. 1 and 12, cooling air is supplied to the fin structures on the peripheral walls 12 and the housings 14 and 16 by a suitable blower mechanism 54 which is driven by suitable gearing diagrammatically illustrated at 56. The air from the cooling fan 54 is supplied to a duct 58 which extends from the cooling fan to an axially extending duct portion 60 which in turn is supported on the outer body of the rotary combustion engine. A baffle plate 62 extends circumferentially around the engine and covers the axially-spaced fins 50 to form a plurality of individual closed cooling passages. The baffle plate 62 also covers the end housings 16 and the intermediate housing 14, and is co-extensive with said fins 50 in the circumferential direction. The baffle plate 62 is provided with openings 64 disposed at the rotor housings 12 and openings 66 disposed at the intermediate and end housings 14 and 16, respectively. By this means, air is supplied from the cooling fan 54 to the duct 58 and into the axially extending duct portion 60 thereof and flows through the openings 64 and 66 in the baffle plate 62 and into the fin structure on the rotor housing and to the fin structure in the intermediate and end housings.

In FIG. 2 it will be seen that the cooling air enters the opening 64 in the baffle plate 62 from the axially extending duct 60 and flows between the axially-spaced cooling fins 50 in a circumferential direction towards the exhaust port where it is preferably discharged therefrom through an opening 68 in the baffle plate 62 adjacent said exhaust port 46. It will be further seen that the opening 64 to the cooling fins 50 is provided downstream of the spark plug 48 and the spark plug bosses 52. As will be further explained hereinafter, the disposition of the spark plug 48 relative to the cooling air flow path is significant in accomplishing the objectives of the invention.

As illustrated in FIG. 2, the rotor 24 is in a position wherein the working chamber 32a is passing through the combustion phase, just having its fuel-air mixture previously been ignited by the spark plug 48. Therefore, this region of the peripheral wall of the rotor housing 12 will be exposed to substantially high heat input from the combustible mixture in the chamber 32a as the gases in said chamber are expanding. It is important for this reason to supply maximum cooling in this region since, as stated above, this is the region of highest heat input and in particular the centermost or center line region between the end faces of the rotor housing 12.

It will be obvious that since the center line fin passage is the region of highest heat flux this center line region of the peripheral walls 12 will be the most difficult portion to cool. Therefore it is advantageous to provide the center line fin passage with a minimum pressure drop since the maximum air-coolable net brake horsepower than can be obtained for the engine may be said to be controlled by the pressure drop in the center line finned passages and the minimum total air weight-flow.

In order to provide maximum cooling in the region of highest heat input, or the zone of combustion, a plurality of scheduled or predetermined sized accelerator plates 70 are inserted between the axially-spaced fins 50 in the region of highest heat input. The accelerator plates or inserts 70 provided between the axially-spaced fins 50 reduce the height of the passages formed between the fins 50 in the high heat input region and form an accelerator throat portion designated at 72 in the region of the lobe junction 74 of the peripheral wall 12. More specifically, the accelerator throat portion 72 extends from the region of the outer body slightly upstream of the lobe junction 74 to a region downstream of said lobe junction 74. Through the use of the accelerator plates 70, the air passing through the accelerator throat region 72 is accelerated or has an increase in velocity through this region so that the heat is rapidly carried away from the fins 50.

As viewed in the circumferential direction, it may be seen that the plates 70 vary in height so that the cooling air passages, in the region of the accelerator throat portion 72, vary from a maximum height adjacent the inlet 64 to a minimum height adjacent the lobe junction 74 and to a maximum at the downstream end of the accelerator throat portion 72. As further shown in the drawings, in particular FIGS. 1–9, it will be seen that the accelerator plates 70 vary in height, as viewed axially across the peripheral wall, so that the profile of the accelerator throat portion 72, illustrated in FIG. 9, has a sinusoidal-type shape. The reason for the particular shape illustrated therein is determined by the variation in heat input across the axial dimensions of the peripheral wall 12. As stated above, the highest heat input is in the center line region or substantially midway between the end faces of the peripheral wall 12 and therefore the greatest amount of cooling air at increased velocity is desired in this region. However, toward the end faces the heat input is not as great as at the center line passages therefore less cooling air is required so that the accelerator throat portion has a substantially restricted height in this region in order to restrict the flow of air at the axial ends thereof while at the center line portion a balance is maintained between the weight-flow of air and the velocity thereof for providing satisfactory cooling at this region. In other words, it may be said that relatively lesser weight-flow of air is provided toward the axially end faces of the peripheral wall or the cooling air passages at this region while a relatively greater weight-flow of air is provided at the center line passage with sufficient fin height to adequately cool the center line passage portion. Through this construction, since a relatively smaller weight-flow of cooling air is supplied to the axial end portion of the peripheral wall, a minimum amount of horsepower is required to supply air to said axial end portions at the accelerator throat 72 and makes available additional horsepower for cooling the center line passage region which, as stated above, is the most difficult region to cool.

As explained above, the center line passage will require the highest weight-flow of cooling air and also the relatively highest pressure drop in the cooling system. Since the inlet pressure to all of the fin passages will be the same, the center line passage is designed to cool with a minimum pressure drop. The pressure drop for the other passages is also the same even though the weight-flow and velocity of the cooling air will vary between the passages. Thus, referring to FIGS. 2 and 5–8, it will be seen that the accelerator plates 70 not only vary in height across the axial dimensions of the peripheral wall 12 but also vary in length with the accelerator plates toward the axial ends of the peripheral wall being progressively longer to provide a longer flow passage. Toward the downstream end of the accelerator throat 72 each cooling passage of the accelerator throat 72 increases in height so that the cooling air from each said passage diffuses into a diffuser section at the downstream end of said accelerator throat 72 wherein high velocity flow of cooling air is no longer required. In the drawings it can be seen that each accelerator plate 70 gradually decreases in height so as to increase the height of its associated cooling passage and thus gradually diffuse the air at the downstream end of the accelerator throat 72.

In the region adjacent the portion of maximum radius of the inner surface 30 of the peripheral wall 12 and downstream of the accelerator throat 72, the heat input is substantially less than the heat input in the region of said accelerator throat 72. In order not to waste cooling horsepower on this region, or in other words to prevent overcooling this region, and in order to reduce friction losses and the pressure drop required for cooling this region the cooling fins 50 are gradually cropped.

By cropping it is meant removing part or all of some of the fins in the region downstream of the accelerator throat portion 72. It will be apparent that the cooling air leaving the accelerator throat portion 72 is flowing at relatively high velocity due to the accelerator plate scheduling with the highest velocity of flow being in the center line cooling passages and slightly lower velocity flow toward the axial end passages. In order to approximate the velocity profile of the cooling air leaving the accelerator throat portion 72 every other cooling fin 50 is preferably cropped or cut back so that this portion of the peripheral wall has a profile as illustrated in FIG. 10 which illustrates a profile substantially opposite to that illustrated in FIG. 9 showing the accelerator throat portion 72. Thus, in FIG. 10 at the center line passages every other one of the cooling fins 50 has the relatively shortest height to provide for the greater weight-flow of air while at the axial end portions thereof the cooling fins 50 have a substantially greater height than the effective height of the cooling fins in the accelerator throat portion showing in FIG. 9. This permits the center line passages to handle the large amount of cooling air coming from the center line passage portion for cooling said center line fin passages with a minimum pressure drop while, since less cooling air volume is coming from the axial end passage portions, the cropping need not be as great at the axial end portions of the peripheral wall downstream of the accelerator throat portion 72. FIGS. 2 and 5–8 further illustrate the shape of the cropped fins as they appear against or overlying an adjacent full size fin 50. Hence, the portion of the peripheral wall 12 downstream from the accelerator throat portion 72 is provided with sufficient but not excessive weight-flow of cooling air for cooling this region without wasting any cooling blower horsepower due to friction losses or excessive pressure drops in the system.

Another region of the outer body which is exposed to relatively high heat input is the area surrounding the exhaust port 46. As the products of combustion are discharged from the exhaust port 46, the heat from said combustion products is transferred to the walls surrounding the exhaust port which also serves to add to the heat input toward the peripheral wall 12. This region is also heated-up from the overall heat input to the peripheral wall due to heat conduction from one region of the peripheral wall to another. For this reason, it is important to provide cooling means for the regions surrounding said exhaust port 46.

As illustrated in FIGS. 2 and 4, for example, the region surrounding the exhaust port 46 is provided with a pluarity of axial extending, inclined cooling passages 76 cut into the outer periphery of the peripheral wall 12. From the drawing in FIG. 4 it will be seen that air may enter said cooling passages 76, for example, from the side housings adjacent to the exhaust port 46 for cooling the wall portion in this region. It is also within the scope of the invention to supply cooling air to the cooling passages 76 from the passages at the ends of the cooling fins 50. Since, as described above, the accelerator throat portion and the portion downstream thereof having the cropped fin construction are constructed so as to limit the weight-flow of cooling air at the axial end portions of the peripheral wall, means are provided for increasing the velocity of the cooling air at the axial end cooling passages to more effectively cool the exhaust port area.

As shown in FIGS. 4, 7 and 8, a plurality of air flow limiting plates 78 which are similar to the accelerator plates 70, are provided between the axially-spaced cooling fins 50 at the axial end cooling passages in the region adjacent the exhaust port 46. Referring to FIG. 11, it will be seen that the air flow limiting plates 78 have a higher or greater radial dimension at the axial ends of the cooling passages than toward the center portions thereof since, as explained above, the weight-flow of cooling air is more restricted toward the axial ends than toward the center portion thereof. Therefore, using a greater radial height for the air flow limiters at the axial ends of the cooling passages serves to provide a greater flow velocity to the cooling air at this region. By increasing the exit velocity of the cooling air at the axial end cooling passages, the cooling air flow is limited at a given passage pressure drop and the increased exit velocity of the cooling air in this region results in both a higher exit pressure drop and more effective cooling of the exhaust port area which is difficult to cool with low values of cooling air flow due to the fact that the cooling air temperature has substantially increased through its travel from the inlet area 64. Thus, by increasing the exit velocity of the cooling air, the pressure drop is increased in this region for discharging the air from the cooling passages and the discharged air from the axial ends thereof becomes available for effective cooling of the exhaust port area.

Normally, in a single path cooling system there is a high cooling air temperature rise through the fin passages. The present invention provides a means for eliminating some of the cooling air temperature rise at the upstream portion of the cooling passages which therefore gives greater overall cooling effectiveness throughout the entire cooling system. Referring to FIG. 2 of the drawings, it will be seen that the spark plug 48 is disposed in a boss 52 in the peripheral wall 12 so that it is slanted in a direction away from the cooling air inlet 64. The spark plug 48 will therefore be out of the cooling air flow path so as not to be an obstruction in said flow path. It will be apparent that the position of the spark plug, as illustrated, will reduce the blower horsepower requirement as compared to a situation wherein the spark plug might obstruct the cooling air flow path since in that case the blower would have to supply a greater quantity of air in order to overcome the obstruction. Also, because of the disposition of the spark plug in the illustrated embodiment, the peripheral wall can be made relatively thinner in the region supporting the spark plug than in prior embodiments of this type of rotary combustion engine. This of course results in better heat transfer in the spark plug region and improved cooling of the peripheral wall. The spark plug 48 may be disposed at different positions other than that illustrated, such as, for example, in a substantially tangential disposition to the peripheral wall. Also the spark plug or plugs 48 may be disposed relatively closer to the axial ends of the peripheral wall 12. As further shown in FIGS. 2, 3 and 5, a plurality of inserts or plate members 80 are provided between the cooling fins 50 in the region adjacent the spark plug bosses 52. Referring particularly to FIGS. 2 and 5 it will be seen that the spark plug boss inserts or plate members 80 extend between the cooling fins 50 upstream of the inlet 64 but the depth of said plate members does not extend entirely inwardly to the peripheral wall but falls short thereof to provide an air-bleed passageway 82 between the peripheral wall 12 and the plate members 80. These small passages between the spark plug bosses provide a reverse flow path or an air-bleed passage to cool the spark plug area and consequently remove a large quantity of heat from the main cooling air stream. It will be obvious that the region adjacent the spark plugs wherein combustion takes place becomes substantially heated-up during engine operation and since the main cooling air stream is supplied below the spark plug bosses, in absence of the bleed passages 82 the cooling air might become substantially heated at its upstream portion before it reached the region of relatively high heat input in the outer body or peripheral wall 12. Therefore, it will be seen that the spark plug bleed passages 82 serve to limit the temperature rise of the cooling air at its upstream portion and thus allow for more effective cooling by the cooling air in the relatively high heat input regions of the peripheral wall 12.

FIGS. 13 and 14 illustrate another embodiment of the invention wherein means are provided for lowering the temperature difference between the inner and outer periphery of the peripheral wall in the hot zone of said peripheral wall. As is well known, the temperature difference across a given wall is proportional to the wall thickness and the quantity of heat input to wall. By decreasing the wall thickness, the temperature difference across the wall will therefore be decreased. As previously explained, in an engine of the type described herein, the heat input to the peripheral wall varies both in the circumferential and axial directions with the region of the peripheral wall adjacent the lobe junction 74 in the circumferential direction and the center line region, relative to the axial ends of the peripheral wall, having the highest heat input.

In order to maximize the heat transfer characteristics in this region of the peripheral wall, the thickness of the peripheral wall, as shown at 12a in FIG. 13, is tapered to a minimum wall thickness at the zone of highest heat input in the circumferential direction so that, from the upstream end of the accelerator throat 72, the peripheral wall 12a gradually tapers to a minimum substantially corresponding with the zone of minimum height of said accelerator throat 72 and gradually tapers back to its original wall thickness at the downstream end of the accelerator throat 72. As shown in FIG. 14, the peripheral wall is tapered from each axial end of the peripheral wall to a minimum thickness at the center line region shown at 12a. Thus, the temperature difference across the peripheral wall in the zones of highest heat input will be minimized in the present embodiment while the peripheral wall is provided with sufficient thickness in the relatively lower heat input regions to satisfy structural considerations. Thus, the embodiment shown in FIGS. 13 and 14 satisfies both heat transfer and structural considerations.

In FIGS. 15 and 16, there is shown another embodiment wherein additional means are provided for obtaining further reductions in cooling air horsepower requirements. Supported over the exhaust port 46 is an exhaust ejector 86 which includes a pipe 88 extending from the exhaust port 46 and a surrounding pipe-like housing 90 having a bell-shaped discharge opening 92. The base 94 of the housing 90 extends over the opening 68 in the baffle plate 62 and also over the exhaust port cooling fins 76 so that air discharging from the cooling fins will flow into the housing 90 for discharge out of the opening 92. The exhaust gases from the engine are directed through the exhaust pipe 88, which terminates a short distance within the surrounding housing 90. The discharge air from the cooling fin structure will enter the housing 90 and flow around the exhaust pipe 88 and mix with the exhaust gases in a mixing chamber area 96. Since the exhaust gases have a substantial amount of kinetic energy upon discharge from the engine working chambers, the mixture of these exhaust gases with the cooling fin discharge air in the mixing chamber 96 will increase the flow of the cooling fin discharge air and thus cause a pumping effect to draw the air from the cooling fin structure. As the air is diffused through the bell-shaped opening or the diffuser 92, the increased velocity of the mixture causes a scavenging effect for rapidly removing the mixture from the exhaust ejector 86. It will thus be apparent that the pumping effect of the exhaust ejector 86 will serve to reduce the blower horsepower requirements for supplying air at the inlet end of the system. The exhaust ejector 86 also has the advantage of not heating up the cooling air with compression work as is the case with mechanical blowers. The overall engine weight and blower requirement may therefore be reduced by decreasing the size of the fan, scroll, blower gear drives, etc.

From the above description, it will be seen that an efficient single path circumferential air cooling system is provided which by taking into account the heat input characteristics of the type of engine described above provides for minimum horsepower drainage from the engine output for cooling the engine. By providing a substantially equal pressure drop for all the cooling passages formed by the cooling fin structure and by scheduling the flow of air in the manner described above, maximum cooling effectiveness is provided in the regions of highest heat input while little cooling air is wasted in regions wherein the heat input is relatively less. The novel construction of the invention permits for the first time a circumferential cooling system using a single path or unidirectional flow air cooling system for a rotary combustion engine which does not create too high a temperature rise in the cooling air so that the cooling air is also effective for cooling the outlet sections of the cooling passages and thus makes the cooling system applicable to engines in relatively high specific horsepower ranges such as, for example, engines having a specific horsepower output in excess of 1.5 net horsepower per cubic inch displacement.

While the invention has been set forth in detail in its preferred embodiment in the above description, it should be understood that the invention is not to be limited to the specific details set forth therein and various changes and modifications may be made by those skilled in the art without departing from the spirit and scope of the invention as defined in the following claims.

What is claimed is:

1. An air cooled outer body structure for a rotary combustion engine having a plurality of working chambers which travel around the outer body axis during operation and wherein the heat rejection from the engine working fluid in said chambers in nonuniform; said outer body structure comprising a peripheral wall having a plurality of circumferentially extending fins projecting outwardly from said outer body peripheral wall forming air passages therebetween, said fins being disposed in a region of relatively high heat rejection to said outer body from the engine working fluid with said fins extending circumferentially from one end of said region to the other, baffle means extending across the outer ends of said fins to close the outer portions of the air passages between said fins, said baffle means being formed to provide an air entrance opening for permitting cooling air to enter into the inter-fin passages adjacent to one end of said region and to provide an air discharge opening for permitting the cooling air to discharge from said inter-fin passages adjacent to the other end of said region, and means to progressively vary the height of said inter-fin passages in a section of said region having relatively high heat rejection to said outer body peripheral wall so that in said section the height of said inter-fin passages progressively decreases to a minimum substantially intermediate of the upstream and downstream portions thereof and progressively increases at the downstream portion of said section.

2. An air cooled outer body structure as recited in claim 1 wherein said fins extend from a first portion of said peripheral wall having the relatively highest heat rejection to said outer body peripheral wall to a second portion at which the working fluid is discharged from said outer body with said cooling air entrance and discharge openings being disposed adjacent to said first and second portions, respectively, and said minmum height section of said inter-fin passages being located adjacent to the upstream ends of said inter-fin passages.

3. An air cooled outer body structure as recited in claim 1 wherein the height of said inter-fin passages in said section having relatively high heat rejection varies progressively from a region intermediate of the axial ends of said peripheral wall toward said axial ends so that the inter-fin passages intermediate of said axial ends have a greater height than the inter-fin passages adjacent said axial ends.

4. An air cooled outer body structure as recited in claim 1 wherein at least some of said fins are cut back in a section of said region downstream of said section having relatively high heat rejection so that the air passages in said downstream section have a relatively greater cross-sectional area than the air passages in said relatively high heat rejection section.

5. An air cooled outer body structure as recited in claim 4 wherein every other fin in said downstream section is cut back with the cut back fins in a region intermediate of the axial ends of said peripheral wall being cut back a relatively greater amount than the cut back fins adjacent said axial ends.

6. An air cooled outer body structure as recited in claim 1 further comprising means for reversing the flow of a portion the cooling air adjacent to the upstream end of said region, said means comprising a plurality of insert members disposed between at least some of said fins with said insert members being in close proximity to but spaced from the outer periphery of said peripheral wall to form a plurality of bleed passages for conducting a flow of cooling air in an opposite direction from the flow of cooling air through said inter-fin passages.

7. An air cooled outer body structure as recited in claim 1 wherein means are provided at the downstream end of said region for increasing the velocity of the flow of cooling air in a group of inter-fin passages adjacent to each axial end of said peripheral wall, said means including a plurality of insert members with each said insert member being disposed between adjacent fins for reducing the height of the associated inter-fin passage.

8. An air cooled outer body structure as recited in claim 7 wherein at least some of the fins between said groups of inter-fin passages are cut back for enlarging the flow area with the fins being cut back progressively toward the center line of said peripheral wall relative to its axial ends so that the cut back fins adjacent the center line of said peripheral wall are cut back a relatively greater amount than the fins adjacent said groups of inter-fin passages.

9. An air cooled outer body structure as recited in claim 1 wherein in the section of said peripheral wall having the relatively highest heat rejection said peripheral wall varies in thickness with said peripheral wall having a minimum thickness in said section of relatively highest heat rejection.

10. An air cooled outer body structure as recited in claim 9 wherein the thicknes of said peripheral wall varies in both the axial and circumferential directions relative to the outer body axis with said peripheral wall having a minimum thickness in the region of the centermost inter-fin passages and in the minimum height section of said inter-fin passages.

11. An air cooled outer body structure as recited in claim 1 wherein said peripheral wall includes a spark plug boss, said spark plug boss being disposed upstream of said baffle means air entrance opening and being constructed for supporting a spark plug in slanting relationship in a direction opposite to the main flow of cooling air through said inter-fin passages so that said spark plug boss and its spark plug do not obstruct the flow of cooling air around said outer body.

12. An air cooled outer body structure as recited in claim 1 wherein said peripheral wall includes exhaust port means for discharging the hot exhaust gases from said outer body, exhaust ejector means for said exhaust port means and including a chamber for mixing the hot exhaust gases with the cooling air discharged from said inter-fin passages and a diffuser for diffusing the mixed gases from said exhaust ejector means such that the mixed gases have an increase in velocity relative to the velocity of the discharged cooling air for pumping cooling air from said inter-fin passages.

13. An air cooled outer body structure for a rotary combustion engine having a plurality of working chambers which travel around the outer body axis during operation and wherein the heat rejection from the engine working fluid in said chambers is nonuniform; said outer body structure comprising a peripheral wall having a plurality of closely-spaced circumferentially-extending fins projecting outwardly from said outer body peripheral wall forming air passages therebetween, said fins being disposed in a region of substantial heat rejection to said outer body from the engine working fluid with said fins extending circumferentially from one end of said region to the other, baffle means extending across the outer ends of said fins to close the outer portions of the air passages between said fins, said baffle means being formed to provide an air entrance opening for permitting cooling air to enter into the inter-fin passages adjacent to one end of said region and to provide an air discharge opening for permitting the cooling air to discharge from said inter-fin passages adjacent to the other end of said region, and at least some of said fins being cut back in a section circumferentially-spaced from said air entrance opening and said air discharge opening for increasing the cooling air flow area in said section with said section being disposed in a portion of said region having relatively low heat input.

14. An air cooled outer body structure as recited in claim 9 wherein said section is disposed downstream of a portion of said region having the relatively highest heat input.

References Cited by the Examiner
UNITED STATES PATENTS

| | | | |
|---|---|---|---|
| 1,078,168 | 11/1913 | Ruhlmann | 123—8 |
| 1,504,926 | 8/1924 | Baisch | 123—8 |
| 1,670,953 | 5/1928 | Browne | 123—8 |
| 3,234,921 | 2/1966 | Laing et al. | 123—8 |

References Cited by the Applicant
UNITED STATES PATENTS

| | | |
|---|---|---|
| 1,024,166 | 4/1912 | Weed. |
| 2,406,551 | 7/1946 | Lucke. |
| 2,406,552 | 7/1946 | Lucke. |

MARK NEWMAN, *Primary Examiner.*

F. T. SADLER, *Assistant Examiner.*